No. 746,268. PATENTED DEC. 8, 1903.
G. BATTY.
OVERSHOE FOR HORSES.
APPLICATION FILED MAR. 21, 1903.
NO MODEL. 2 SHEETS—SHEET 1.
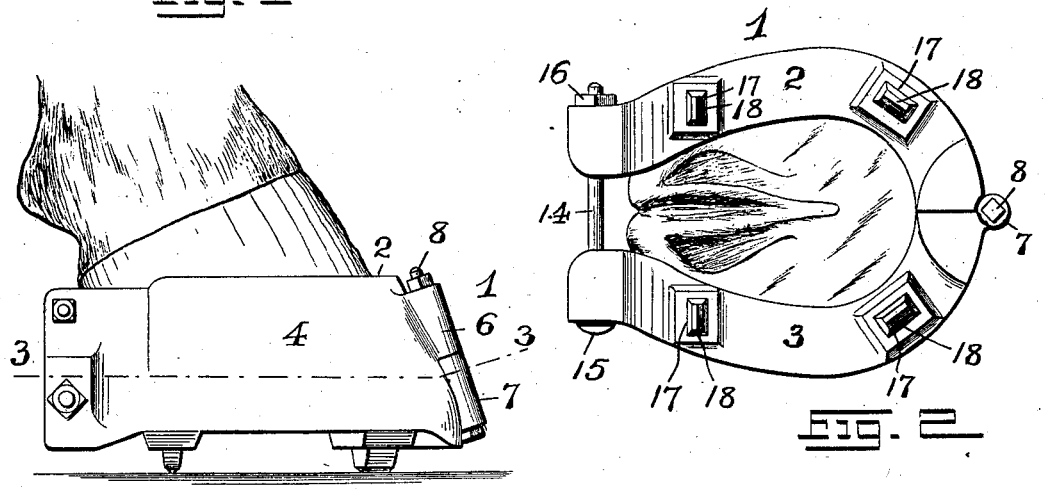
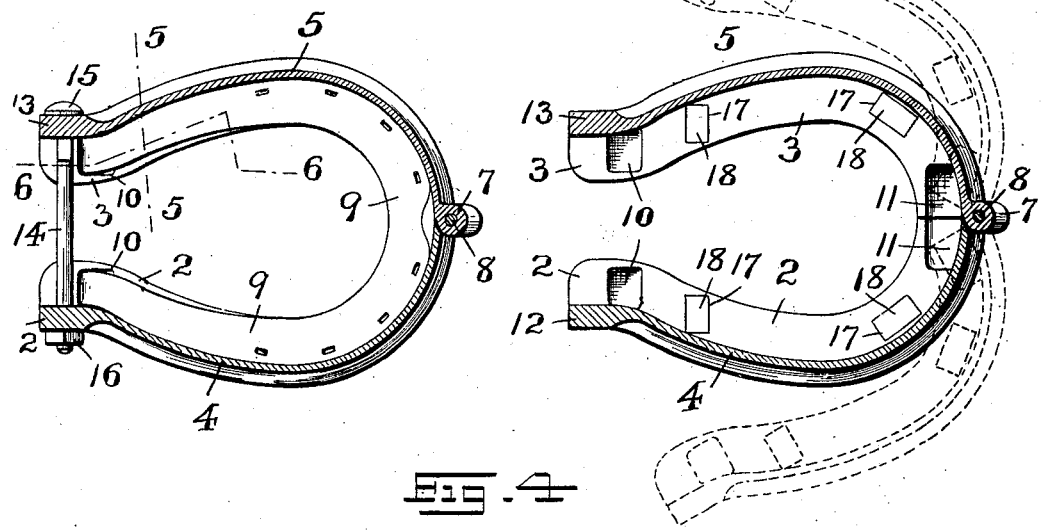
WITNESSES:
Geo. D. Richards
Geo. Douglass.
INVENTOR:
George Batty,
BY
Fred'k C. Fraentzel,
ATTORNEY No. 746,268. PATENTED DEC. 8, 1903.
G. BATTY.
OVERSHOE FOR HORSES.
APPLICATION FILED MAR. 21, 1903.
NO MODEL. 2 SHEETS—SHEET 2.
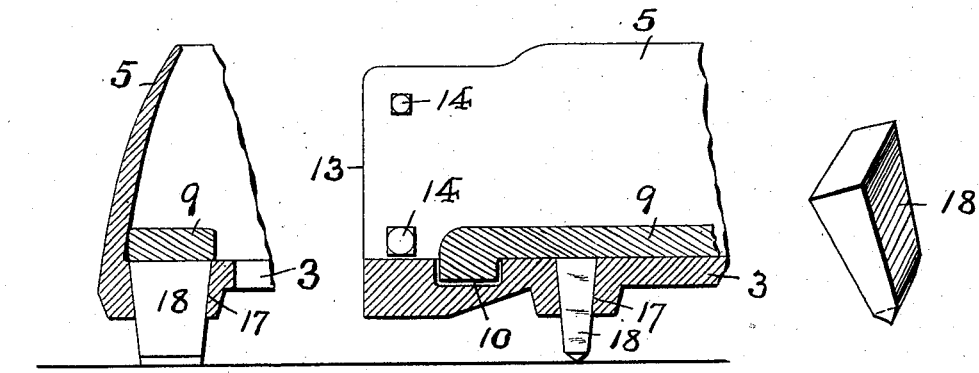
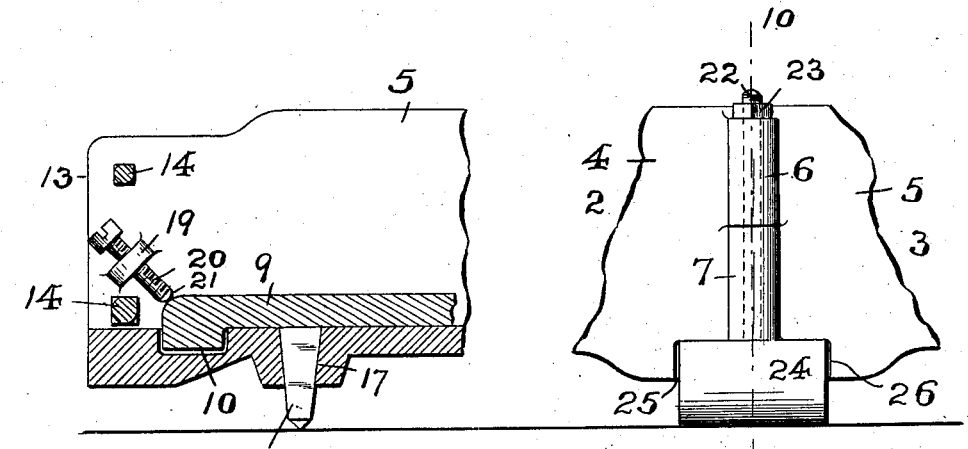
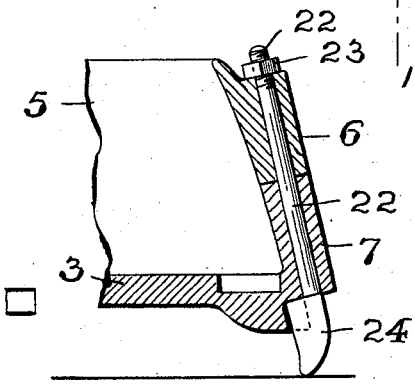
WITNESSES: Geo. D. Richards, Geo. Douglass
INVENTOR: George Batty,
BY Fred L. Fraentzel,
ATTORNEY No. 746,268. Patented December 8, 1903.

UNITED STATES PATENT OFFICE.

GEORGE BATTY, OF NEWARK, NEW JERSEY, ASSIGNOR TO HIMSELF AND PATRICK McGINTY, OF NEWARK, NEW JERSEY.

OVERSHOE FOR HORSES.

SPECIFICATION forming part of Letters Patent No. 746,268, dated December 8, 1903.

Application filed March 21, 1903. Serial No. 148,823. (No model.)

*To all whom it may concern:*

Be it known that I, GEORGE BATTY, a citizen of the United States, residing at Newark, in the county of Essex and State of New Jersey, have invented certain new and useful Improvements in Overshoes for Horses; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has reference to what may be termed "overshoes" for horses, the said shoes being detachably connected with and surrounding a part of the hoof of the horse's feet and being arranged directly against the usual iron or other shoe with which the bottom of the hoof is provided.

The present invention has for its principal objects to provide a simply-constructed overshoe for horses which can be quickly attached in its position upon the hoof provided with the usual shoe, so as to prevent slipping upon icy and slippery pavements, and, furthermore, to provide a novel overshoe having removable calks which when they have become dull can be quickly replaced by a new set of sharp calks, these calks being easily inserted in place when the overshoe is removed from the hoof and are held in their operative positions by the weight of the horse's hoof resting directly upon the calks in the manner hereinafter more particularly specified.

Other objects of this invention not at this time more particularly specified will be clearly understood from the following description of my present invention.

The invention therefore consists in the novel overshoe for the hoofs of horses hereinafter more particularly described; and, furthermore, this invention consists in the various novel arrangements and combinations of parts, as well as in the details of the construction thereof, all of which will be set forth in detail in the following specification and then finally embodied in the clauses of the claim.

The invention is clearly illustrated in the accompanying drawings, in which—

Figures 1 and 2 are side and bottom views, respectively, of an overshoe embodying the principles of this invention, the same being represented in its attached position upon the hoof. Fig. 3 is a horizontal section of the overshoe, said section being taken on line 3 3 in said Fig. 1 and illustrating in connection therewith the usual iron horseshoe in position in the receiving portions or members of the overshoe. Fig. 4 is a similar section of the said overshoe without the representation of the said horseshoe, and the bolts at the ends of the pivotally-connected members or webs of the overshoe being removed, the said view also representing the said members or webs in dotted outline in their opened or spread positions. Fig. 5 is a transverse section taken on line 5 5 in said Fig. 3. Fig. 6 is a sectional representation taken on line 6 6 in said Fig. 3, and Fig. 7 is a perspective view of one of the removable calks. Fig. 8 is a longitudinal representation of a portion of the overshoe and the heel end of the horseshoe, illustrating in connection with these parts a different means in addition to that represented in the preceding figures of the drawings for securing the overshoe in position upon the hoof. Fig. 9 is a face view of the hinged or pivoted end portion of the two members of the overshoe, the pintle or pivot-bolt in this case being provided with a toe-calk instead of the usual bolt-head; and Fig. 10 is a vertical section taken on line 10 10 in said Fig. 9.

Similar characters of reference are employed in all of the views to indicate corresponding parts.

In the said drawings the reference character 1 indicates the complete overshoe, the same comprising a pair of movably-connected or hinged members 2 and 3, which when arranged in their relatively closed positions are of the general outer configuration of the hoof of the horse, so as to be clapped about the lower part of the hoof, as shown, and then secured in position.

As will be seen from an inspection of Figs. 1 to 4, inclusive, the member 2 is made with an upwardly-extending and inwardly-inclining wall or web 4, and in like manner the other member 3 is made with an upwardly-extending and inwardly-inclining wall or web 5, all conforming to the general contour of the horse's hoof, said walls or webs 4 and 5 being made with pintle-receiving sockets, as 6 and 7, for the reception of a pintle or pivot-bolt 8. In this manner the two members of the overshoe are pivotally connected in the manner of a hinge and can be arranged in their closed relation about the hoof and against the ordinary horseshoe, as shown, or said members 2 and 3 can be opened out or spread apart, as indicated in the dotted outline in Fig. 4. That the said members 2 and 3 can be properly fitted against the under surface of the horseshoe 9 each member is preferably made with a receiving depression or recess 10 for the reception of the heels of the horseshoe 9 and with the connecting receiving depressions or recesses 11 for the reception of the usual toe of the horseshoe 9. The said walls or webs 4 and 5 are provided in their oppositely-placed and rearwardly-extending end portions 12 and 13 with bolt-receiving holes, in which I have arranged suitable bolts 14, each bolt having a head 15 and a nut 16 upon its screw end, by means of which the overshoe can be secured in its position about the lower part of the hoof and against the horseshoe 9 when the nut 16 is tightened, as will be clearly understood.

Referring now more particularly to Figs. 4, 5, and 6, it will be seen that each member 2 and 3 is made with suitably-disposed openings 17, the inner surfaces or sides of said openings tapering downwardly, so as to receive and retain in said openings correspondingly-tapered calks 18. When these calks are arranged in the said openings 17, the upper surfaces of the calks will lie flush with the upper surfaces of said members 2 and 3, and when the overshoe has been attached to the hoof then the said calks will be retained in their positions by having their said upper surfaces placed directly against the under face of the horseshoe 9.

From the above description it will be evident that the overshoe can be quickly applied to the hoof and over the usual horseshoe thereon, serving in icy and slippery weather the same purpose of a newly calked or sharpened shoe. Furthermore, by the arrangement of the detachable calks it will be evident that the overshoe can be supplied from time to time with new and sharp calks when the old calks become worn, and there is therefore no necessity of tearing the horseshoe from the hoof every time that new or sharpened calks are desired.

The members 2 and 3 and their webs or walls 4 and 5 are made of thin metal which is sufficiently strong to serve the purposes for which the overshoe is intended, and therefore does not add considerably to the weight, and the calks are preferably made of tempered steel.

That there may be no possible displacement of the overshoe 1 from the hoof and the horseshoe 9 each web or wall 4 and 5, as will be seen from Fig. 8, may be provided with a suitably-disposed boss 19, having a screw-threaded hole for the reception of a suitable set-screw 20, which can have its lower end 21 screwed down tightly upon or against the horseshoe 9, whereby the said members 2 and 3 are drawn against the exposed surface of the horseshoe 9, and thereby hold the parts against any possible movement or displacement.

In lieu of the pintle or pivot-bolt 8 a bolt 22, provided with a head 24, made in the usual shape of a toe-calk may be employed, if desired, the said toe-calk or head 24 of said bolt 22 resting in the offsets 25 and 26 of the members 2 and 3 and the bolt being held tightly in position by the nut 23, as clearly represented in Figs. 9 and 10 of the drawings.

I am aware that some changes may be made in the arrangements and combinations of the parts comprising the overshoe for horses without departing from the scope of my present invention. Hence I do not limit my invention to the exact arrangements and combinations of the parts as described in the previous specification and as illustrated in the accompanying drawings, nor do I confine myself to the exact details of the construction of the said parts.

Having thus described my invention, what I claim is—

1. An overshoe for horses comprising a pair of hinged members provided with upwardly-extending and inwardly-inclining webs, all made to conform to the contour of the hoof, said members being provided with recesses for the reception of the toe and heel calks of the ordinary shoe, said members being also provided with openings opposite the shoe, calks removably arranged in said openings, and means for securing said members in position upon said hoof, substantially as and for the purposes set forth.

2. An overshoe for horses comprising a pair of hinged members provided with upwardly-extending and inwardly-inclining webs, all made to conform to the contour of the hoof, said members being provided with recesses for the reception of the toe and heel calks of the ordinary horseshoe, said members being also provided with openings opposite the shoe, calks removably arranged in said openings, and means for securing said members in position upon said hoof, consisting of tie-bolts arranged in perforations formed in the rearwardly-extending portions of said members, substantially as and for the purposes set forth.

3. The combination, with a horseshoe, of an overshoe having openings therein, and calks removably arranged in said openings, said calks having their upper ends in close contact with said horseshoe and being thereby held in position, substantially as and for the purposes set forth.

4. The combination, with a horseshoe, of an overshoe comprising a pair of hinged members, said members being provided with openings, and calks removably arranged in said openings, said calks having their upper ends in close contact with said horseshoe and being thereby held in position, substantially as and for the purposes set forth.

5. The combination, with a horseshoe, of an overshoe having openings therein, and calks removably arranged in said openings and held in position by contact with said horseshoe, substantially as and for the purposes set forth.

In testimony that I claim the invention set forth above I have hereunto set my hand this 17th day of March, 1903.

GEORGE BATTY.

Witnesses:
FREDK. C. FRAENTZEL,
PATRICK E. MCGINTY.